(12) United States Patent
Goldsberry

(10) Patent No.: US 7,988,225 B2
(45) Date of Patent: Aug. 2, 2011

(54) VEHICLE FRONT FASCIA SUPPORT MEMBER

(75) Inventor: Nicholas Goldsberry, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 232 days.

(21) Appl. No.: 12/331,047

(22) Filed: Dec. 9, 2008

(65) Prior Publication Data
US 2009/0243315 A1 Oct. 1, 2009

Related U.S. Application Data

(60) Provisional application No. 61/040,852, filed on Mar. 31, 2008.

(51) Int. Cl.
*B60R 19/44* (2006.01)

(52) U.S. Cl. .............. 296/193.09; 296/187.09; 293/133; 293/155

(58) Field of Classification Search ............. 296/193.09, 296/187.04, 187.09; 293/133, 143, 120, 293/155
See application file for complete search history.

(56) References Cited

U.S. PATENT DOCUMENTS

| | | | |
|---|---|---|---|
| 3,926,463 A * | 12/1975 | Landwehr et al. | 293/136 |
| 4,193,621 A * | 3/1980 | Peichl et al. | 293/142 |
| 5,018,138 A * | 5/1991 | Twitty et al. | 370/448 |
| 5,061,108 A | 10/1991 | Bien et al. | |
| 5,123,695 A | 6/1992 | Kanemitsu et al. | |
| 5,358,304 A | 10/1994 | Kanemitsu et al. | |
| 5,462,325 A | 10/1995 | Masuda et al. | |
| 5,580,109 A * | 12/1996 | Birka et al. | 293/120 |
| 5,915,767 A | 6/1999 | Hosoda et al. | |
| 6,010,169 A * | 1/2000 | Cox et al. | 293/120 |
| 6,357,821 B1 * | 3/2002 | Maj et al. | 296/193.09 |
| 6,520,553 B2 * | 2/2003 | Muramatsu | 293/155 |
| 6,634,702 B1 * | 10/2003 | Pleschke et al. | 296/187.04 |
| 6,644,700 B2 * | 11/2003 | Ito et al. | 293/117 |
| 6,729,681 B2 | 5/2004 | Yustick | |
| 6,880,882 B2 | 4/2005 | Andre et al. | |
| 6,893,064 B2 * | 5/2005 | Satou | 293/132 |
| 6,948,769 B2 | 9/2005 | Borkowski et al. | |
| 6,988,753 B1 | 1/2006 | Omura et al. | |
| 6,997,490 B2 | 2/2006 | Evans et al. | |
| 7,013,951 B2 | 3/2006 | Bauer et al. | |
| 7,048,326 B2 | 5/2006 | Yasui | |
| 7,192,068 B1 | 3/2007 | Kim | |
| 7,210,719 B2 | 5/2007 | Honda et al. | |
| 7,273,246 B2 | 9/2007 | Wada | |

(Continued)

OTHER PUBLICATIONS

Design News Staff; "Thin-wall bumper fascias save cost, weight"; Design News; Feb. 16, 1998; Reed Business Information, a division of Reed Elsevier Inc.; http://www.designnews.com/article/print/11953-Thin_wall_bumper_fascias_save_cost_weight.php.

*Primary Examiner* — Glenn Dayoan
*Assistant Examiner* — Gregory Blankenship
(74) *Attorney, Agent, or Firm* — Mark E. Duell; Rankin Hill & Clark LLP

(57) ABSTRACT

A support member for attaching a vehicle fascia such as a front bumper fascia, to a vehicle frame or other support component is described. The support member includes a bracket at one end of the member and various fasteners for attachment to the vehicle fascia.

20 Claims, 4 Drawing Sheets

U.S. PATENT DOCUMENTS

| | | | |
|---|---|---|---|
| 7,303,219 B2 * | 12/2007 | Trabant et al. | 293/155 |
| 7,434,872 B2 * | 10/2008 | Steller | 296/193.09 |
| 7,517,006 B2 * | 4/2009 | Kageyama et al. | 296/187.09 |
| 7,540,550 B1 * | 6/2009 | Huber et al. | 296/29 |
| 7,597,383 B2 * | 10/2009 | Itou et al. | 296/187.04 |
| 7,641,267 B2 * | 1/2010 | Makino | 296/193.1 |
| 7,644,966 B2 * | 1/2010 | Huber et al. | 293/155 |
| 7,681,700 B2 * | 3/2010 | Ginja et al. | 188/377 |
| 7,733,219 B2 * | 6/2010 | Kamei et al. | 340/436 |
| 7,766,418 B2 * | 8/2010 | Hemmersmeier | 296/193.1 |
| 2002/0117875 A1 * | 8/2002 | Hoffner et al. | 296/194 |
| 2006/0202517 A1 * | 9/2006 | Pelini | 296/193.09 |
| 2008/0001433 A1 * | 1/2008 | Noyori et al. | 296/187.04 |

* cited by examiner

VEHICLE FRONT FASCIA SUPPORT MEMBER

BACKGROUND OF THE INVENTION

The presently disclosed embodiments are directed to the field of vehicle front end assemblies, and particularly to front bumper fascias and support members therefor.

Front vehicle assemblies are designed to meet a variety of requirements. The assemblies must absorb shocks and impacts from collisions. The assemblies must also have provisions for accommodating and supporting numerous components such as certain engine components, driving lights, vehicle accessory lights, hood engagement mechanisms, and depending upon the vehicle, may include various structures for improving vehicle aerodynamics. In addition, front vehicle assemblies are designed to exhibit favorable aerodynamic characteristics themselves, even if they are to receive additional aerodynamic components such as air dams or the like. Furthermore, vehicle front assemblies should be attractive and exhibit desirable aesthetic qualities.

Front bumper fascias are typically large panels that are designed to extend across the front of a vehicle, cover the shock absorbing components, improve vehicle aerodynamics, and provide an attractive appearance. Front bumper fascias are preferably one-piece, integrally formed components. A trend in the current vehicle market, is to use these large, one-piece front bumper fascias since they can be readily formed by injection molding techniques and designed to exhibit attractive styling and good aerodynamic properties.

One-piece bumper fascias are becoming increasingly complex. That is, many current vehicle fascias exhibit an array of compound curvatures and changing shapes at different regions of the fascia. This trend, coupled with such fascias being a single, integral piece, requires unique supporting structures for such fascias. Various designs have been proposed for supporting such fascias to a vehicle support frame or other member, such as described in U.S. Pat. Nos. 5,061,108; 5,580,109; 6,997,490; and 7,273,246. Although satisfactory, a need remains for yet further improvements in supporting a geometrically complex vehicle fascia.

More recently, increasing demands for lighter weight vehicles has prompted the use of fascias with thinner walls. It is typical for vehicle fascia walls to be less than 5 mm, less than 4 mm, and in certain applications, less than 3 mm. A consequence of using such relatively thin fascia walls, is that the resulting fascia is less rigid and thus prone to excessive deformation. Although a low rigidity and relatively flexible fascia can be made rigid by using an abundance of support members, the greater the number of support members used, the more complex is the resulting assembly. Such complex assemblies are time consuming and expensive to install.

Accordingly, a need exists for a single support member that can support a relatively large region of a front vehicle fascia, such as a front bumper fascia, to thereby eliminate the requirement for multiple support members and the attendant complexity, assembly time demands, and costs associated therewith.

A particular difficulty in supporting a geometrically complex fascia is the large number of peripheral regions resulting from an irregular fascia perimeter or outer edge. These peripheral regions typically extend within three dimensions. For example, a fascia having non-linear perimeter edges for accommodating an adjacent hood or light assembly presents regions of material in multiple dimensional planes that if not sufficiently supported, can fracture or deform if excessively loaded, can create unacceptable dimensional tolerances with respect to adjacent panels, excessively vibrate, and detract from the overall aesthetics of the vehicle.

Therefore, a need exists for a single support member that can support a peripheral region of a geometrically complex fascia, to thereby impart structural rigidity to that region and the rest of the fascia, maintain as-installed dimensional tolerances between the fascia and adjacent panels, and render that region relatively immune to excessive vibration.

SUMMARY OF THE INVENTION

The difficulties and drawbacks associated with previous-type systems are overcome in the present method and apparatus for a support member particularly adapted for supporting a vehicle panel.

In one aspect, the present invention provides a support member adapted for supporting a vehicle fascia. The support member comprises a longitudinal member having a first end, a second end opposite from the first end, and a body extending between the first and second ends. The body defines a front face, an oppositely directed rear face, and a top face extending between the front and rear faces. The support member also comprises a bracket projecting from the longitudinal member and disposed proximate the first end of the longitudinal member. The bracket is adapted for mounting to a vehicle structural component. The support member additionally comprises a first fastener affixed to the body of the longitudinal member. The first fastener is adapted to engage a vehicle fascia and provide support for the fascia against displacement out of a first plane. And, the member also comprises a second fastener affixed to the longitudinal member proximate the second end of the longitudinal member. The second fastener is adapted to engage the vehicle fascia and provide support for the fascia against displacement out of a second plane different than the first plane. The support member further comprises a third fastener affixed to the longitudinal member proximate the second end of the longitudinal member. The third fastener is adapted to engage the vehicle fascia and provide support for the fascia against displacement out of a third plane different than the first plane and the second plane.

In another aspect, the present invention provides a support member adapted to support a vehicle panel having a plurality of engagement members disposed along an inner face of the panel. The support member comprises a longitudinal member including (i) a first end for mounting to a vehicle support, (ii) a second end opposite the first end, and (iii) a body extending between the first end and the second end, in which the body defines a top face. The support member also comprises at least one fastener disposed on the top face of the body and adapted to engage an engagement member disposed on an inner face of the vehicle panel. The at least one fastener on the top face of the body provides support for the panel from being displaced out of a first plane generally parallel with a longitudinal axis of the body. And, the support member comprises at least one fastener disposed on the second end of the longitudinal member and adapted to engage an engagement member disposed on the inner face of the vehicle panel. The at least one fastener on the second end of the longitudinal member provides support for the panel from being displaced out of a second plane generally transverse to the longitudinal axis of the body. The support member further comprises at least one fastener disposed on the second end of the longitudinal member and adapted to engage an engagement member disposed on the inner face of the vehicle panel. The at least one fastener on the second end of the longitudinal member provides support for the panel from being displaced out of a third plane generally parallel with the longitudinal axis of the body.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

The present invention provides a support member adapted for supporting a vehicle panel, and particularly a region of a geometrically complex vehicle fascia. The support member can be attached to a vehicle frame or other structure at only one end. The cantilevered mounting of the present invention member enables the member to provide support for a specific desired region or portion of a vehicle fascia. Moreover, the unique configuration of fasteners at a distal end of the member and/or along the length of the member provide a wide range of applications for the support members of the present invention.

Figure 1:
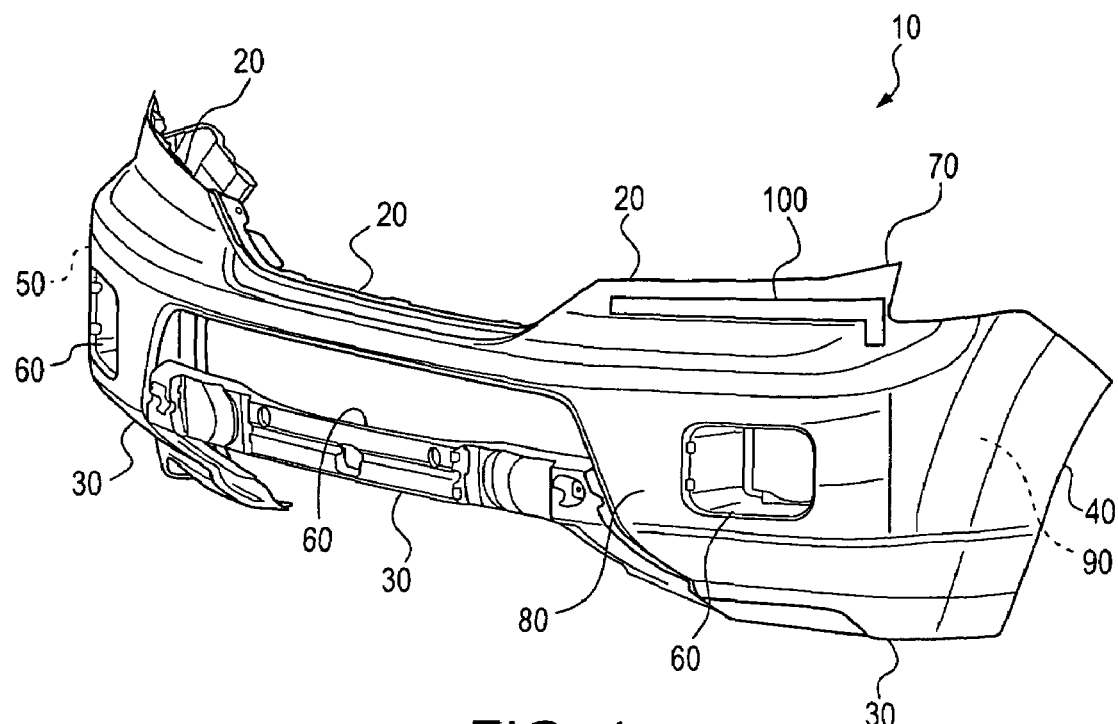
FIG. 1 is a perspective view of a vehicle front fascia and representative location of a preferred embodiment support member in accordance with the present invention.

FIG. 1 is a perspective view of a vehicle front fascia 10 and representative location of a preferred embodiment support member 100 in accordance with the present invention. The fascia defines an upper edge 20, a lower edge 30, a first side edge 40 generally extending between the upper edge 10 and the lower edge 30, and a second side edge 50 generally extending between the upper edge 20 and the lower edge 30. The fascia also defines one or more component openings 60, such as openings for lights or air entryways. Typically, the fascia 10 may define one or more fascia projections 70 that are generally thin, outwardly extending portions of the main fascia member which result from two or more converging outer edges meeting. Typically, projections 70 are located at or along the interface of the front fascia 10 and an adjacent panel or other vehicle component such as a hood or headlight (not shown). The fascia also defines an outer face 80 which typically receives one or more layers of paint in the desired exterior color(s), and an oppositely directed inner face 90.

Figure 2:
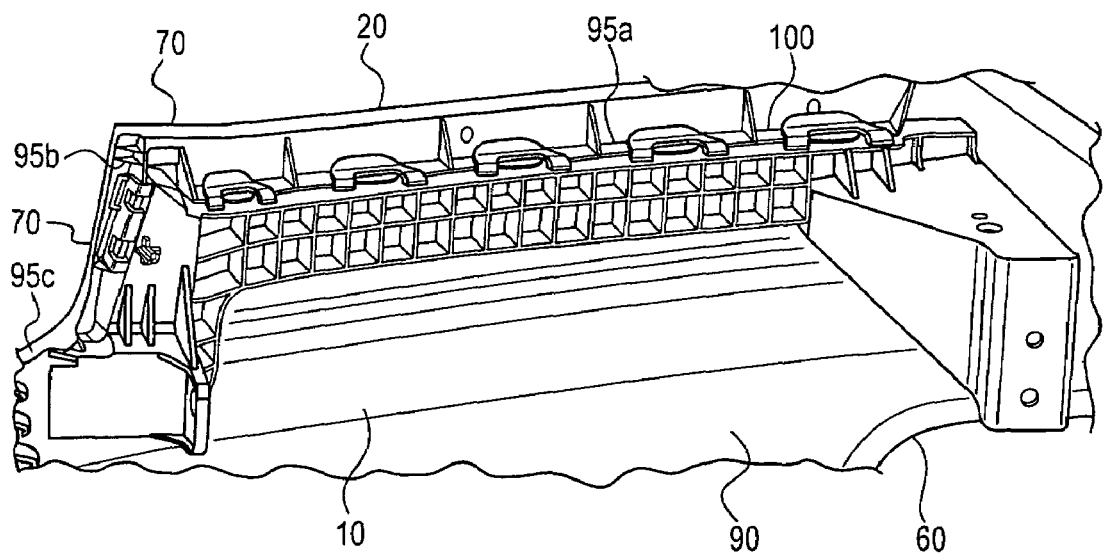
FIG. 2 is a schematic view of the inner face of a portion of the vehicle front fascia depicted in FIG. 1, illustrating a rear face of a preferred embodiment support member engaged thereto.

FIG. 2 is a schematic view of the inner face 90 of a portion of the vehicle front fascia 10 depicted in FIG. 1, illustrating the preferred embodiment support member 100 engaged thereto. FIG. 2 also illustrates a plurality of ribs 95 provided along the inner face 90 of the fascia 10. The ribs 95 can serve a variety of functions such as providing strength and improved rigidity to the fascia 10, providing a point of attachment to the fascia, or a combination of these functions. As explained in greater detail herein, the ribs 95 may be oriented in a variety of different fashions and configurations. For example, a first rib or first set of ribs 95a extends along the inner face 90 of the fascia 10, and is disposed in relatively close proximity to the upper edge 20 of the fascia. The first rib or first set of ribs 95a may also extend in relatively close proximity to an edge of the fascia that defines the fascia projection 70. Preferably, the rib 95a extends in a parallel direction as the upper edge 20. A second rib or second set of ribs 95b extends along the inner face 90 of the fascia 10, and is disposed in relatively close proximity to an edge of the fascia that defines the fascia projection 70. A third rib or third set of ribs 95c extends along another edge of the fascia 10, and preferably that defines the fascia projection 70. The orientation of these various ribs and corresponding fasteners on the preferred embodiment support member 100 are described in greater detail herein.

Figure 3:
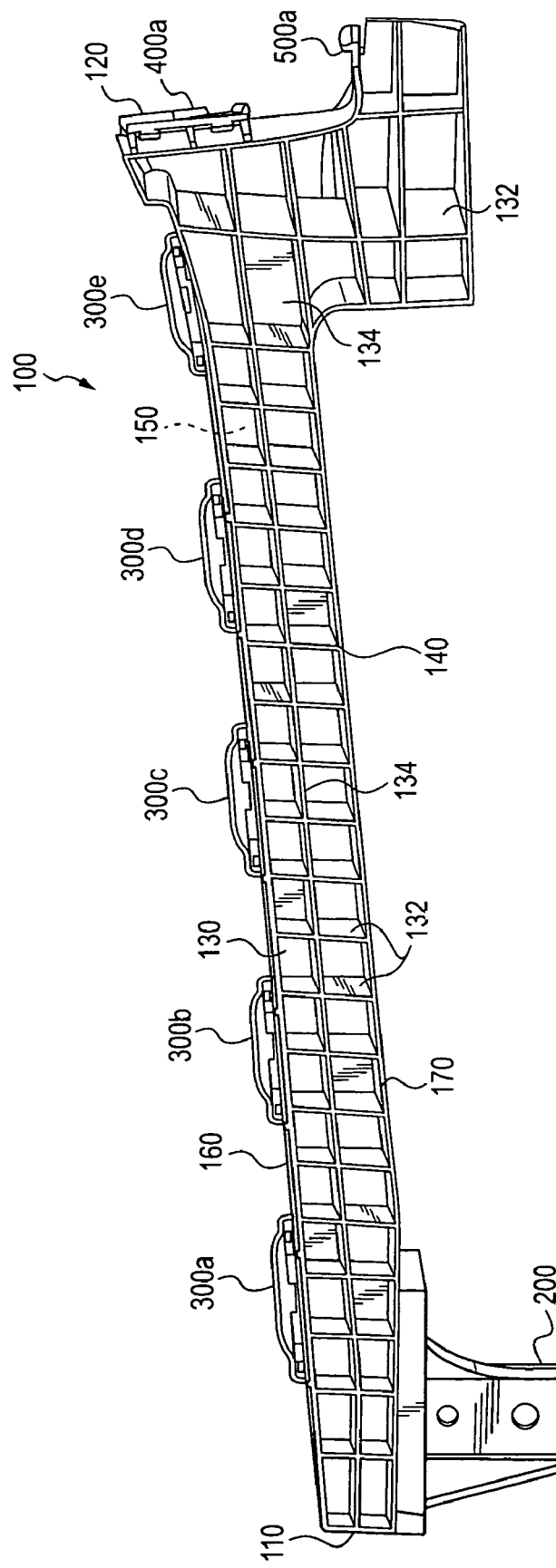
FIG. 3 is a perspective view of the preferred embodiment support member shown in FIG. 2, illustrating a front face of the support member.

FIG. 3 is a perspective view of the preferred embodiment support member 100 shown in FIG. 2, illustrating a front face 140 of the support member. The support member 100 defines a first end 110, a second end 120 opposite from the first end 110, and includes a longitudinal body or member 130 extending between the first and second ends 110 and 120, respectively. The longitudinal member 130 preferably defines a front face 140, a rear face 150 generally directed in an opposite direction as compared to the front face 140, a top face 160 generally extending between the front and rear faces 140 and 150, respectively, and a bottom face 170, generally opposite from the top face 160. It will be appreciated that the body 130 can have a greater or lesser number of faces and so can exhibit a wide array of cross sectional shapes. The support member also defines a bracket 200 extending from the first end 110 of the member 100. The bracket 200, as described in greater detail herein, preferably extends rearwardly from an end, such as the first end 110, of the longitudinal member 130. The member 130 may include, or be formed to define, a collection of partition members such as a first set of partition members 132 and a second set of partition members 134. The plurality of partitions define a collection of interior hollow regions. As will be appreciated, this configuration can be used to reduce the weight of the member while promoting the overall strength and rigidity of the member. Also provided on the preferred embodiment member 100 is a first or first set of fasteners 300, shown in the figures as 300a, 300b, 300c, 300d, and 300e; a second or second set of fasteners 400, shown in the figures as 400a; and a third or third set of fasteners 500, shown in the figures as 500a. These fasteners 300, 400, and 500 and their engagement with corresponding regions of attachment on the fascia 10, such as ribs 95, are described in greater detail herein.

Figure 4:
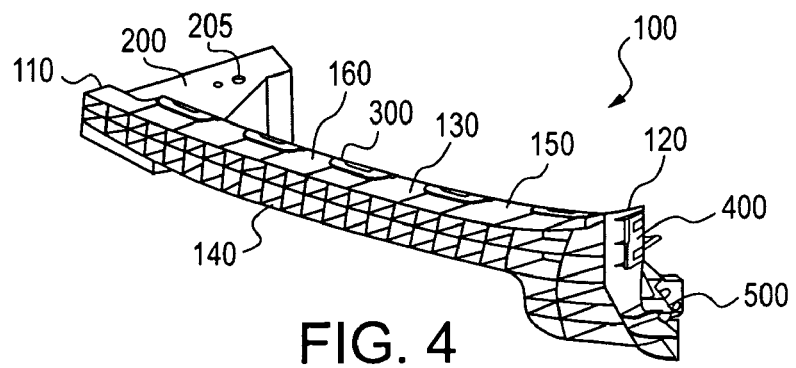
FIG. 4 is another perspective view of the preferred embodiment support member illustrating the front face of the member.

FIG. 4 is another perspective view of the preferred embodiment support member 100 illustrating the front face 140 of the member 100. FIG. 4 illustrates a preferred configuration of the bracket 200 and its orientation with regard to the longitudinal member 130. Preferably, the bracket 200 projects rearwardly, i.e. towards the same direction as that to which the rear face 150 is generally directed. The bracket 200 also preferably extends from the first end 110 of the support member 100. The bracket 200 defines one or more apertures such as aperture 205 for mounting the support member 100 to a vehicle frame or other structure. Disposed at the other end, opposite the bracket 200, are the fasteners 400 and 500.

Figure 5:
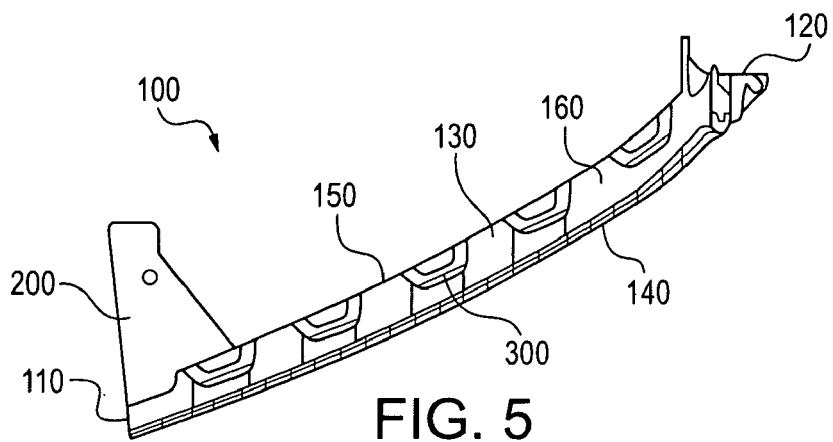
FIG. 5 is a planar view of the preferred embodiment support member.

FIG. 5 is a planar view of the preferred embodiment support member 100, illustrating the top face 160 of the member 100. The plurality of fasteners 300 are evident along the top face 160 of the longitudinal member 130. Also, it will be appreciated that although a slight curvature along the front face 140 is evident in FIG. 5, the present invention includes support members that exhibit different curvatures or configurations including one in which the front face 140 is straight or essentially planar.

Figure 6:
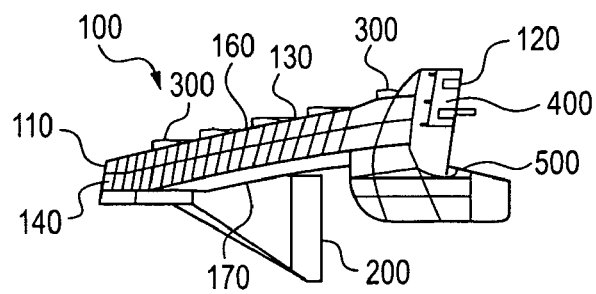
FIG. 6 is an end view of the preferred embodiment support member.

FIG. 6 is an end view of the preferred embodiment support member 100, illustrating the second end 120 of the member 100. As previously noted, disposed at the second end 120 are preferably the second or second set of fasteners 400 and the third or third set of fasteners 500. FIG. 6 also illustrates a preferred configuration for the bracket 200, that it have a triangular shape when viewed from its side. This configuration provides an increased area for mounting the bracket to a vehicle frame or other structure.

Figure 7:
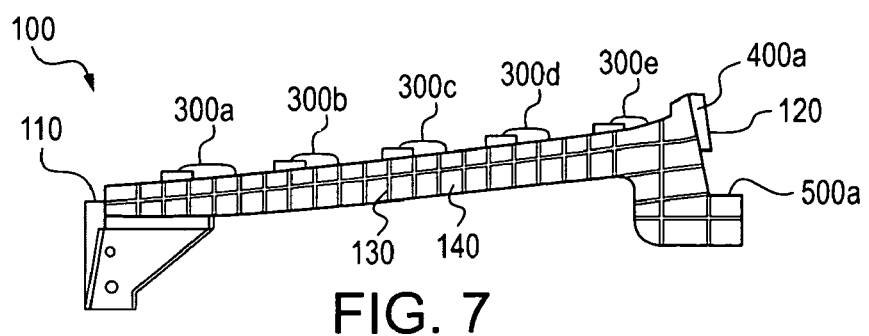
FIG. 7 is a front elevational view of the preferred embodiment support member.

FIG. 7 is a front elevational view of the preferred embodiment support member 100, depicting the front face 140 of the member 100. FIG. 7 shows an exemplary arrangement of the first set of fasteners 300, depicted as fasteners 300a, 300b, 300c, 300d, and 300e. It will be understood that the present invention includes a greater or lesser number of the fasteners 300. It is also contemplated that the fasteners 300 could be provided along a bottom face of the longitudinal member 130. FIG. 7 also shows an exemplary arrangement for the second set of fastener(s) 400, depicted as a single fastener 400a. It will be understood that the invention includes the use of two or more fasteners 400, and that such fasteners 400 can be located along other regions of the support member 100 in addition to, or instead of, the second end 120. FIG. 7 also shows an exemplary arrangement for the third set of fastener(s) 500, depicted as a single fastener 500a. It will be understood that the invention includes the use of two or more fasteners 500, and that such fasteners 500 can be located along other regions of the support member 100 in addition to, or instead of, the second end 120.

Figure 8:
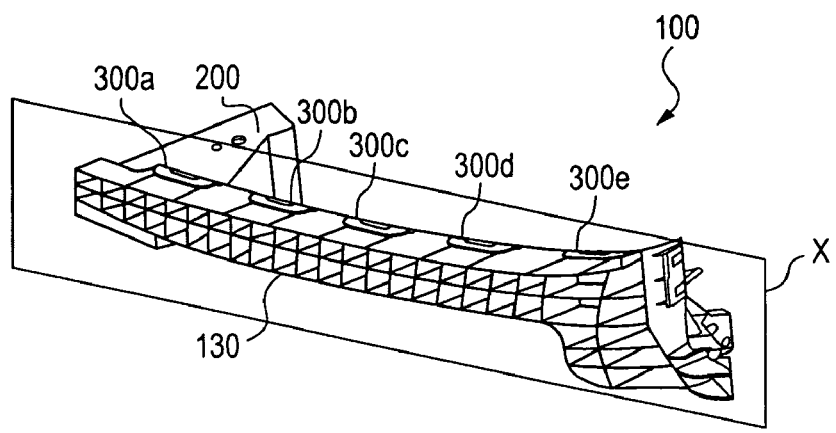
FIG. 8 is a perspective view of the preferred embodiment support member illustrating a first fastener or first set of fasteners provided on the member that provide support against displacement of the support member out of a plane illustrated as plane X.

FIG. 8 is a perspective view of the preferred embodiment support member 100 illustrating a first fastener 300 or first set of fasteners 300a, 300b, 300c, 300d, and 300e provided on the member 100 that provide support against displacement of the support member 100 out of a plane designated as X. That is, the support member 100 provides support against forces or loads applied in a direction generally transverse to plane X. This is explained by reference to FIG. 2. As previously explained, FIG. 2 illustrates a rib 95a extending along an inner face 90 of the fascia 10. By engaging the support member 100 to the rib 95a by use of the fasteners 300a-300e, the fascia 10 and particularly fascia projection 70 can be supported against displacement out of plane X. It is to be appreciated that although reference is made to plane X, most fascias that are engaged with the fasteners 300 will not be planar along the entire length of the support member 100. Hence, the designation to plane X may also include two dimensional boundaries or regions having a slight curvature in that they follow the contour of the front face of the member 100. Preferably, the plane X is parallel or substantially so, to a longitudinal axis of the longitudinal member 130. Preferably, the fastener(s) 300 are oriented to engage a horizontal rib extending from the vehicle fascia. It is also recognized that the fastener 300 or set of fasteners 300a-300e can provide support against displacement of the member 100 out of other planes.

Figure 9:
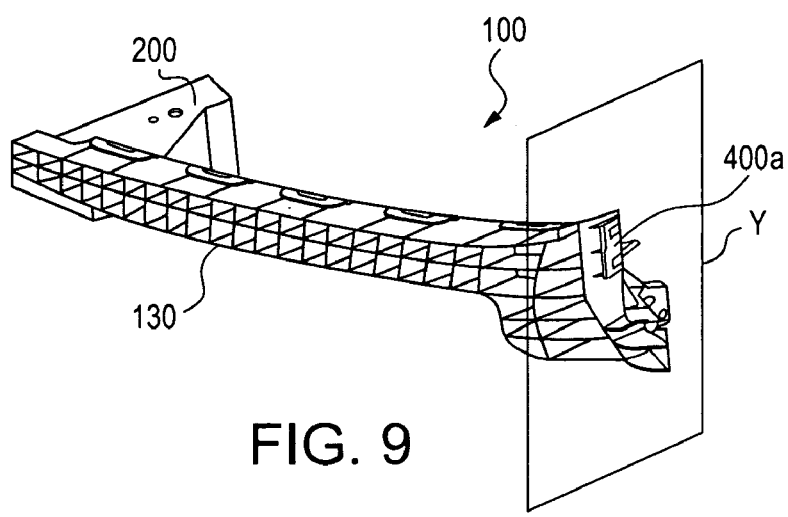
FIG. 9 is another perspective view of the preferred embodiment support member illustrating a second fastener or second set of fasteners provided on the member that provide support against displacement of the support member out of a plane illustrated as plane Y.

FIG. 9 is another perspective view of the preferred embodiment support member 100 illustrating a second fastener 400 or second set of fasteners 400a provided on the member 100 that provide support against displacement of the support member 100 out of a plane designated as Y. Specifically, the support member 100 provides support against forces or loads applied in a direction generally transverse to plane Y. Referring to FIG. 2, by engaging the support member 10 to the rib 95b by use of the fastener 400a, the fascia 10 and particularly fascia projection 70, can be supported against displacement out of plane Y. Preferably, the plane Y is generally transverse to the longitudinal axis of the longitudinal member 130. Preferably, the fastener 400 is oriented to engage a vertical rib extending from the vehicle fascia. It is recognized that fastener 400 can also provide support for the member 100 from being displaced in other directions.

Figure 10:
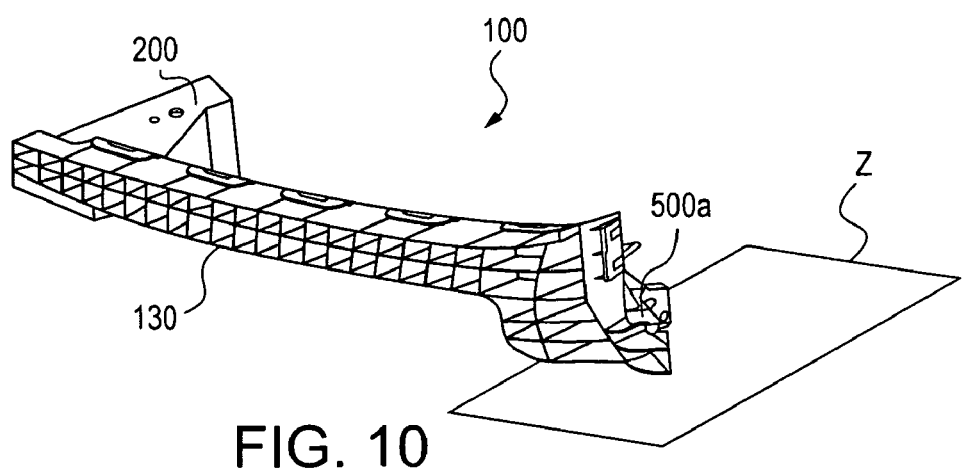
FIG. 10 is another perspective view of the preferred embodiment support member illustrating a third fastener or third set of fasteners provided on the member that provide support against displacement of the support member out of a plane illustrated as plane Z.

FIG. 10 is another perspective view of the preferred embodiment support member 100 illustrating a third fastener 500 or third set of fasteners 500a provided on the member 100 that provide support against displacement of the support member 100 out of a plane designated as Z. Support member 100 provides support against forces or loads applied in a direction generally transverse to plane Z. Referring to FIG. 2, by engaging the support member 100 to the rib 95c by use of the fastener 500a, the fascia 10, and particularly fascia projection 70, can be supported against displacement out of plane Z. Preferably, the plane Z is generally parallel to the longitudinal axis of the longitudinal member 130. Preferably, the fastener 500 is oriented to engage a horizontal rib extending from the vehicle fascia. And, it will be understood that fastener 500 can also provide support for the member 100 from being displaced in other directions.

Preferably, the present invention support member, such as support member 100, includes appropriately positioned and appropriately oriented fasteners so that when engaged to a fascia, the support member provides support to resist displacement out of at least one of planes X, Y, and Z; preferably to resist displacement out of at least two of planes X, Y, and Z; and most preferably to resist displacement out of all three planes X, Y, and Z.

The present invention support member can be used as a sole support member to stabilize, retain, and engage a relatively large region of a vehicle fascia, and particularly, an outwardly projecting peripheral region of a fascia.

Many other benefits will no doubt become apparent from future application and development of this technology.

The present invention support member can be formed from a wide range of materials, such as but not limited to metals, polymeric materials such as plastics, composite materials, or combinations thereof. Preferably the support members are formed from a plastic material having suitable physical characteristics. The present invention support member is preferably formed by one or more molding operations.

The fasteners used for fasteners 300, 400, and 500 can be nearly any type of fastener as typically used in the art. It is preferred that the fasteners be integrally formed with the support member. The fasteners can be resilient blind plastic clips with self-locking provisions as known in the art.

All patents referenced herein are incorporated herein in their entirety.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A support member adapted for supporting a vehicle fascia, the support member comprising:
  a longitudinal member having a first end, a second end opposite from the first end, and a body extending between the first and second ends, the body defining a front face, an oppositely directed rear face, a top face extending between the front and rear faces, and a plurality of partitions that define a plurality of interior hollow regions;

a bracket projecting from the longitudinal member and disposed proximate the first end of the longitudinal member, the bracket adapted for mounting to a vehicle structural component;

a first fastener affixed to the body of the longitudinal member, the first fastener adapted to engage a vehicle fascia and provide support for the fascia against displacement out of a first plane;

a second fastener affixed to the longitudinal member proximate the second end of the longitudinal member, the second fastener adapted to engage the vehicle fascia and provide support for the fascia against displacement out of a second plane different than the first plane; and a third fastener affixed to the longitudinal member proximate the second end of the longitudinal member, the third fastener adapted to engage the vehicle fascia and provide support for the fascia against displacement out of a third plane different than the first plane and the second plane.

2. The support member of claim 1 wherein the first fastener is disposed on the top face of the body of the longitudinal member between the first end and the second end.

3. The support member of claim 1 wherein the first plane is generally parallel to a longitudinal axis of the longitudinal member.

4. The support member of claim 1 wherein the second plane is generally transverse to the longitudinal axis of the longitudinal member.

5. The support member of claim 1 wherein the third plane is generally parallel to a longitudinal axis of the longitudinal member.

6. The support member of claim 1 wherein the bracket projects rearwardly from the longitudinal member.

7. The support member of claim 1 wherein the member is formed from a polymeric material.

8. The support member of claim 1 wherein the first fastener is oriented to engage a horizontal rib extending from the vehicle fascia.

9. The support member of claim 1 wherein the second fastener is oriented to engage a vertical rib extending from the vehicle fascia.

10. The support member of claim 1 wherein the third fastener is oriented to engage a horizontal rib extending from the vehicle fascia.

11. A support member adapted to support a vehicle panel having a plurality of engagement members disposed along an inner face of the panel, the support member comprising:

a longitudinal member including (i) a first end for mounting to a vehicle support, (ii) a second end opposite the first end, and (iii) a body extending between the first end and the second end, the body defining a top face;

at least one first fastener disposed on the top face of the body and adapted to engage an engagement member disposed on an inner face of the vehicle panel, the at least one first fastener disposed on the top face of the body providing support for the panel from being displaced out of a first plane generally parallel with a longitudinal axis of the body;

at least one second fastener disposed on the second end of the longitudinal member and adapted to engage an engagement member disposed on the inner face of the vehicle panel, the at least one second fastener disposed on the second end of the longitudinal member providing support for the panel from being displaced out of a second plane generally transverse to the longitudinal axis of the body, wherein the at least one second fastener on the second end of the longitudinal member is oriented to engage a vertical rib extending from the vehicle fascia; and at least one third fastener disposed on the second end of the longitudinal member and adapted to engage an engagement member disposed on the inner face of the vehicle panel, the at least one third fastener disposed on the second end of the longitudinal member providing support for the panel from being displaced out of a third plane generally parallel with the longitudinal axis of the body.

12. The support member of claim 11 wherein the longitudinal member includes a plurality of partitions that define a plurality of interior hollow regions.

13. The support member of claim 11 further comprising:

a bracket projecting from the first end of the longitudinal member and adapted for mounting to the vehicle support.

14. The support member of claim 13 wherein the bracket projects rearwardly from the longitudinal member.

15. The support member of claim 11 wherein the member is formed from a polymeric material.

16. The support member of claim 11 wherein the at least one first fastener on the top face of the body is oriented to engage a horizontal rib extending from the vehicle fascia.

17. The support member of claim 11 wherein the at least one third fastener on the second end of the longitudinal member is oriented to engage a horizontal rib extending from the vehicle fascia.

18. A support member for supporting a vehicle fascia comprising a unitary body formed from a polymeric material, the unitary body including a first end, a second end opposite the first end, a longitudinal member extending between the first end and the second end, wherein the longitudinal member defines a front face, a rear face, and at least one of a top face and a bottom face, the unitary body further including a first fastener formed on at least one of the top face and the bottom face for providing support for the fascia against displacement out of a first plane, a second fastener formed proximate the second end for providing support for the fascia against displacement out of a second plane, which is different than the first plane, and a third fastener formed proximate the second end for providing support for the fascia against displacement out of a third plane, which is different than the first plane and the second plane.

19. The support member of claim 18, wherein the unitary body further includes a bracket projecting from the longitudinal member and formed proximate the first end.

20. The support member of claim 18, wherein the longitudinal member includes a plurality of partitions that define a plurality of interior hollow regions.

* * * * *